No. 675,515. Patented June 4, 1901.
C. A. LONG.
BAND CUTTER AND FEEDER FOR THRESHING MACHINES.
(Application filed July 26, 1900.)
(No Model.) 2 Sheets—Sheet 1.
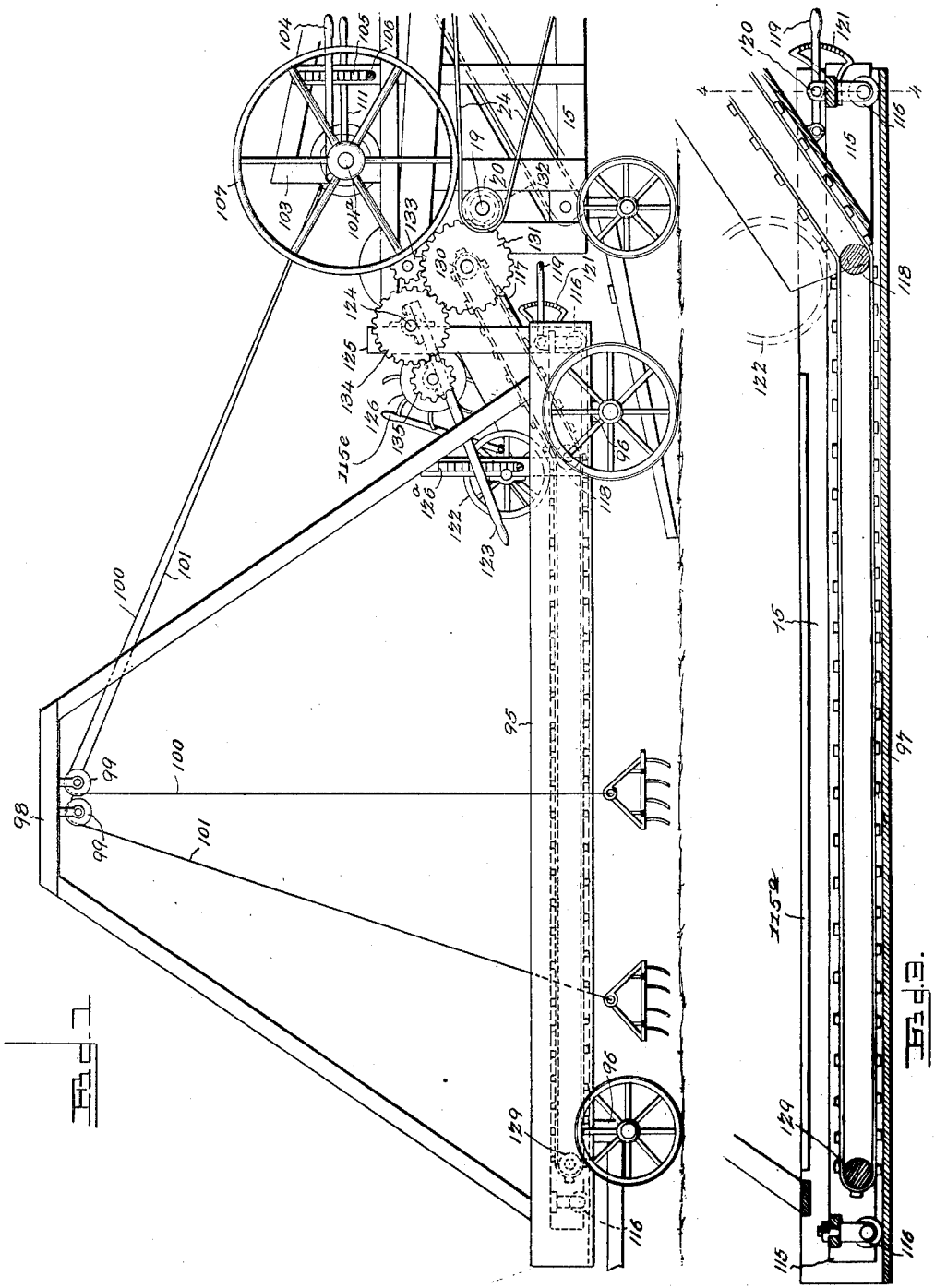

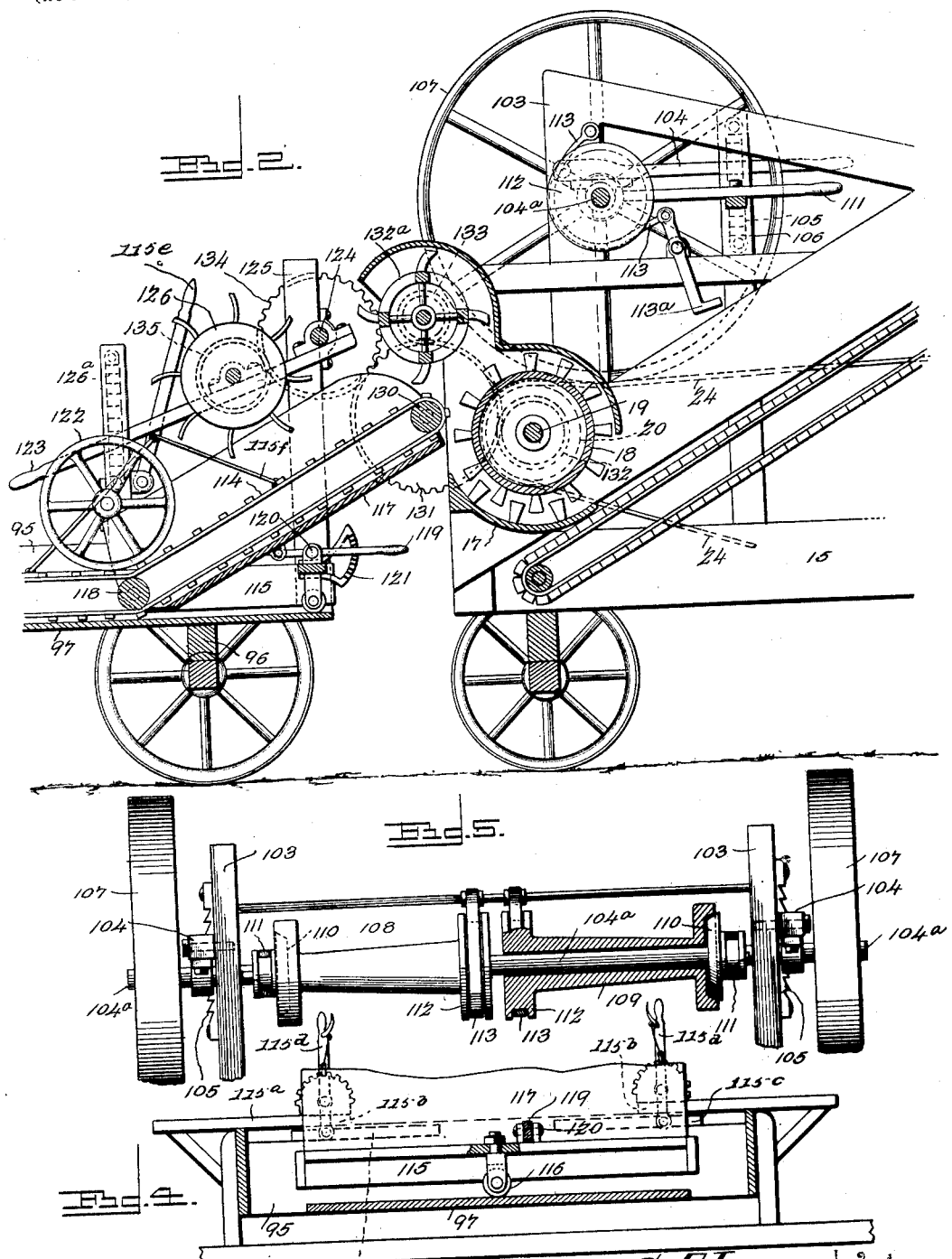

UNITED STATES PATENT OFFICE.

CHARLES ALBERT LONG, OF POMEROY, WASHINGTON.

BAND-CUTTER AND FEEDER FOR THRESHING-MACHINES.

SPECIFICATION forming part of Letters Patent No. 675,515, dated June 4, 1901.

Original application filed February 10, 1899, Serial No. 705,715. Divided and this application filed July 26, 1900. Serial No. 24,941. (No model.)

*To all whom it may concern:*

Be it known that I, CHARLES ALBERT LONG, a citizen of the United States, residing at Pomeroy, in the county of Garfield and State Washington, have invented a new and useful Band-Cutter and Feeder for Threshing-Machines, of which the following is a specification.

My invention relates to improvements in band-cutter and feeder mechanisms for threshing-machines, the subject-matter of my present improvements being a division of a prior application for Letters Patent of the United States, filed by me on February 10, 1899, Serial No. 705,715.

The band-cutter and feeder mechanism of my invention is directed more particularly to that class in which a structure separate from the threshing-machine is employed, and in service it is found that the position of the feeder with relation to the threshing-cylinder is frequently such that the feeder devices cannot be properly disposed with relation to the feed-mouth of the threshing-machine and to the driving mechanism on such threshing-machine for the propulsion of the operating elements of the feeder. To overcome these objections, I have devised a construction by which the feeder-conveyer may be adjusted toward or from the threshing-cylinder in the direction of the length of the threshing-machine, such feeder-conveyer being adjustable horizontally in a direction at right angles to the plane of the threshing-machine. My feeder mechanism includes as one element thereof an endless conveyer which is equipped with an inclined length or section adapted to be adjusted in a vertical direction independently of the endwise or transverse bodily adjustment of the feeder-conveyer, whereby said conveyer and its inclined adjustable section may be moved in any direction, so as to be brought into proper relation to the mouth of the threshing-machine under all conditions of service.

The invention further relates to a fork mechanism as a part of the feeder mechanism, such fork mechanism being operative by power derived from the threshing-machine for the purpose of loading the grain upon the feeder-conveyer. Said fork mechanism is in duplicate, with means for the independent control of the forks to insure the rapid handling of large quantities of grain, and each fork is controlled in a manner to effect its operation for the proper discharge of the load of grain on the feeder-conveyer. The driving-shaft for the fork mechanism is propelled by devices in operative relation to certain working parts of the threshing-machine, and this driving-shaft and its associated parts serve to maintain the driving-belts for the threshing-cylinder under the necessary tension to secure maximum efficiency.

With these ends in view the invention consists in the novel combination of elements and in the construction and arrangement of parts, which will be hereinafter fully described and claimed.

To enable others to understand the invention, I have illustrated a preferred embodiment in the accompanying drawings, forming a part of this specification, and in which—

Figure 1 is a side view of part of a threshing-machine, illustrating my improved band-cutting and feed mechanism in operative relation thereto. Fig. 2 is a longitudinal sectional elevation, on an enlarged scale, of the inner part of the band-cutter and feeder, which lies contiguous to the feeding end of a threshing-machine. Fig. 3 is a longitudinal section through the derrick-table and the shiftable feeder-conveyer supported thereby, the feeder being disconnected from the threshing-machine. Fig. 4 is a transverse section on the plane indicated by the dotted line 4 4 of Fig. 3. Fig. 5 is an enlarged view in front elevation, partly in section, of the mechanism for independently controlling the cables of the lifting-forks.

The same numerals of reference are used to indicate like and corresponding parts in each of the several figures of the drawings.

In order that others skilled in the art may understand the application of my band-cutting and feed mechanism, I have illustrated by Figs. 1 and 2 of the drawings a part of the threshing-machine; but it is to be understood that the invention is not restricted to the use of the band-cutting and feeding mechanism in connection with any particular type of threshing-machine or grain-separator. For convenience in illustration I have illustrated a part of the threshing-machine of that type disclosed in my application of which the present application is a division, and the numerals of reference which are used in said original application are also employed in the present application to indicate the corresponding parts.

The casing or frame of the threshing-machine is indicated by the numeral 15, and this threshing-machine, like others of its class, is equipped with a cylinder-concave 17 and a revoluble cylinder 18, which has its shaft 19 journaled in proper bearings on the machine-frame. The ends of the cylinder-shaft are extended for the reception of the driving-pulleys 20, and around these pulleys pass the driving-belts 24, which serve to rotate the threshing-cylinder and also to propel the shaft which operates the fork-cables, as will hereinafter more fully appear.

The feeder of my invention is constructed with a frame 95, which forms a part of the derrick or truck of the feeder, and said frame is supported by wheeled axles 96, which are suitably connected to the frame to provide for its convenient transportation. The derrick or truck of the feeder-frame is provided with a wide bearing rail or bottom 97, (see Figs. 2, 3, and 4,) and said derrick or truck 95 furthermore carries an overhead elevated frame 98, which supports the sheaves 99, that are adapted to direct the fork-cables 100 101. Each fork-cable is attached at one end to a grain-fork 102 of any suitable construction, and, as will hereinafter appear, the cables 100 101 are associated with independent spools, by which the cables may be controlled separately, so that one cable may be lowered for its fork to be loaded with grain, while the other cable is drawn in by its spool for the purpose of elevating the fork and suspending the latter, with its load, over the derrick or truck 95.

On the casing 15 of the threshing-machine, near the front end thereof, is erected a frame 103, and on this frame is hung or fulcrumed a pair of levers 104. These levers are provided with journal-bearings, as shown by Figs. 2 and 5, for the reception of a shaft 104$^a$, that serves to support and operate the spools by which the fork-cables are manipulated. The driving-shaft 104$^a$ of the fork mechanism is thus supported directly on the levers, so as to be adjustable therewith, and the free ends of said levers are adapted to engage with segments 105, which are fastened on uprights 106 of the casing 15. The levers 104 may be engaged with the segments 105 to raise the driving-shaft 104$^a$ to an elevated position, where its driving-wheels 107 will be free from engagement with the belts 24, that propel the threshing-cylinder, thereby throwing the shaft of the fork mechanism out of gear with the driving-belts. Said wheels 107 are secured firmly to the ends of the fork-driving shaft 104$^a$, and these wheels are of large diameter, so that they may be engaged frictionally with the cylinder-driving belts 24. It will be understood that the levers 104 may be depressed to lower the shaft 104$^a$ for the wheels 107 to engage frictionally with the belts 24, and thereby drive the fork-controlling shaft, and when these levers are thus lowered they may be engaged with segments 105, in order to maintain the several parts in position to be driven by the wheels 107. These driving-wheels serve a twofold purpose—that is to say, they engage with the driving-belts 24 at a point adjacent to the pulleys on the cylinder-shaft, so that the driving-belts will be maintained in a taut condition in order to secure maximum efficiency, and at the same time the wheels 107 are rotated by frictional contact with the belts for the purpose of propelling the shaft 104$^a$. This shaft carries two spools, (indicated at 108 109 in Fig. 5 of the drawings,) each spool being mounted loosely on the shaft to rotate freely thereon when its clutch is adjusted to uncouple said spool from the shaft. Each spool is constructed at one end for engagement by a friction-clutch 110, which is controlled by a lever 111, mounted or fulcrumed on the frame or uprights 103, and the levers of the two clutches 110 are adapted to be operated separately, in order that one clutch may make its spool fast with the shaft 104$^a$ when the other clutch is adjusted to release its spool from engagement with said shaft. Each spool is therefore provided with a brake-disk 112, which is engaged by a band or shoe 113, controlled by a foot-treadle 113$^a$. It will be understood that each spool is equipped with a brake mechanism which is independent of like mechanism for the other spool, and in the practical construction of my invention the levers 111 for the two clutches of the spools and the treadles 113$^a$ for the brakes of the two spools will be arranged on the casing 15, substantially as indicated by Fig. 2, in order that a single operator, who may be seated on the machine, may control the levers 104, the levers 111, and the treadles 113$^a$, all these parts being within easy access of the attendant. In connection with the threshing-machine a pneumatic stacker of the well-known type and which is not here shown is used. The means for controlling the pneumatic stacker are in the practical operation of the threshing-machine in connection with my improved feeder mechanism disposed within easy reach of the attendant, so that he may also conveniently control the stacker mechanism.

I would have it understood that I do not confine myself to the use of any particular type of clutch or of brake for controlling each spool that operates one of the fork-cables, because I am aware that these elements may be modified within wide limits by a skilled constructor.

From the foregoing description it will be understood that each spool for the fork-cable may be clutched fast with the shaft 104ª and unclutched therefrom independently of the other spool and that each spool when released from the shaft may be controlled by its brake. This is an important feature of the fork mechanism, because it enables each spool to be clutched to the shaft 104ª to rotate therewith and coil the fork-cable on said spool in order to raise the fork with the load of grain in a suspended position over the derrick of the feeder. When the fork, with its load, arrives at a proper position over the feeder-conveyer, the operator should manipulate the clutch to release the spool from the shaft, and the brake-shoe may then be manipulated, in order to arrest the rotation of the spool and prevent the uncoiling of the fork-cable until the fork assumes a position where it will properly deposit the load of grain upon the feeder-conveyer, after which the tension of the brake on the spool may be eased in order to allow the spool to rotate idly on the shaft and permit the fork-cable to uncoil from the spool, so that the fork, with its load, may descend by gravity to a position adjacent to the feeder-conveyer, thus enabling the fork to be controlled to deposit its load with precision and accuracy on the feeder-conveyer.

The endless feeder-conveyer 114 is shown by Figs. 3 and 4 in the form of an apron provided with a series of slats, and this conveyer is supported by a wheeled frame 115, which is mounted within the derrick or truck frame 95, so as to be adjustable in any direction therein. The feeder-frame 115 is provided at its opposite ends with caster-wheels or, as they may be termed, "pivot-wheels" 116, and said wheels are properly connected to the feeder-frame, so as to turn in horizontal planes for the purpose of securing an adjustment of the feeder-frame longitudinally and transversely of the derrick or truck frame. The adjustable wheeled frame 115, which carries the traveling endless conveyer, is provided at the end contiguous to the threshing-machine with an inclined adjustable section 117, which is pivotally connected to the horizontal length of the wheeled frame 115 at the point where an idler-roller 118 is journaled in the horizontal length of said frame 115, said idler-roller 118 being arranged between the upper and lower lengths of the endless slatted conveyer 114 in order to act against said lower length of the conveyer to hold the same in its proper relation to the horizontal and inclined members 115 117 of the wheeled feeder-frame. This inclined length of the feeder-frame may be adjusted in a vertical direction by means of a lever 119, which is fulcrumed at 120 on a part of the adjustable frame 115, and one end of this lever is suitably connected to the adjustable inclined length 117 of said frame, while its other end is adapted to engage with a rack or segment 121, attached to the end of the frame 115, adjacent to one of the pivot or caster wheels, all as clearly shown by Fig. 4 of the drawings. The wheeled frame which carries the endless conveyer also sustains all of the operative elements which are associated with the endless feeder-conveyer, and one of these elements is a tightener-wheel 122, which is adjustably supported in journal-bearings on uprights which are attached to the frame 115. (See Figs. 1 and 2.) The tightener-wheel is adapted to ride against the endless traveling feeder-conveyer at a point substantially over the idler-roller 118, and said tightener-roller engages with the upper length of the endless conveyer in order to maintain the latter in its proper relation to the horizontal and inclined members of the wheeled conveyer-frame. I employ a pair of levers 123 to support a band-cutter and spreader cylinder in active relation to the inclined length of the endless feeder-conveyer. These levers 123 are hung loosely on a shaft 124, which is supported in a pair of posts 125, that are attached to the wheeled conveyer-frame 115, and said levers 123 are provided with journal-bearings to receive the shaft of the spreader-cylinder 126. The free ends of the levers 123 are adapted to engage with segments 126ª, which are fastened to the posts 115, which suspend the shaft of the tightener-wheel 122, said posts 115 being also fastened to the horizontal length of the adjustable feeder-frame 115.

The endless feeder-conveyer 114 passes continuously along the horizontal frame 115 and the inclined section 117, and at one end this endless feeder-conveyer passes around an idler-roller 129, which is journaled in the sides of the frame 115. (See Figs. 1 and 3.) The other end of the endless feeder-conveyer, which passes along the inclined length 117 of the adjustable frame, is arranged around the driving-roller 130, which is journaled in suitable bearings at the upper end of the inclined length 117 of the frame, and on the ends of the shaft of this driving-roller 130 are secured gears 131, which are adapted to mesh directly with gear-pinions 132 on the shaft of the threshing-cylinder, whereby the roller 130 for the endless feeder-conveyer is geared directly to the threshing-cylinder in order that said cylinder may propel the feeder-conveyer.

Within the cap or housing of the threshing-machine, at the front or mouth end thereof and above the horizontal plane of the threshing-cylinder, is arranged a cylinder 132ª, the shaft of which is journaled in suitable bearings provided on the casing 15 of the threshing-machine. The ends of the shaft for the cylinder are extended beyond the casing 15 to receive the gears 133, which are arranged to mesh directly with the gears 131 on the shaft of the driving-roller 130, and it will therefore be seen that the threshing-cylinder shaft is adapted to rotate the driving-roller 130 and the cylinder 132ª through the described train of gearing. The shaft 124, which serves as the fulcrum for the levers 123, is provided with gears 134, which are arranged to mesh with the gears 131 on the driving-roller of the feeder-conveyer, and these gears 134 intermesh with gears 135 on the shaft of the spreader-cylinder 126, so that the driving-roller 130 operates through the gears 134 and 135 to rotate the spreader-cylinder. It will be understood that the band-cutter and spreader cylinder 126 is provided with teeth arranged to engage with the straw as it is carried in an upward direction by the inclined section of the endless feeder-conveyer, and said cylinder thus serves to cut the bands and to loosen the straw before it is delivered by the feeder-conveyer to the threshing-cylinder. The cylinder $132^a$ is also provided with teeth or knives, which are adapted to sever any bands on the sheaves or shocks of wheat or other grain which may remain uncut after the grain passes the cylinder 126, which grain is to be fed to the threshing-cylinder, and this cylinder $132^a$ also serves to compact or compress the grain as it is delivered over the end of the feeder-conveyer to the threshing-cylinder. Said cylinder also prevents the grain from passing in an upward direction between itself and the cap or housing of the threshing-machine, and the grain is thus properly fed to the threshing-machine.

It will be understood that the truck or derrick which carries the feeder is a separate structure from the threshing-machine, and in transporting the apparatus from one place to another the threshing-machine is hauled or drawn separately from the derrick or truck. It frequently occurs that the threshing-machine occupies an elevated or depressed position with relation to the feeder apparatus, or, vice versa, the end of the feeder apparatus may be depressed below or raised above the position assumed by the threshing-cylinder. Difficulty is also sometimes encountered in arranging the feeder apparatus in proper alinement with the mouth of the threshing-machine, and to overcome these difficulties I have constructed the feeder so that the wheeled frame for the endless feeder-conveyer may be adjusted transversely across the line of the threshing-machine, or it may be moved lengthwise of the threshing-machine, or the inclined section of the adjustable frame and the endless feeder-conveyer may be raised or lowered. It will therefore be understood that if the feeder-conveyer and its frame do not properly aline with the threshing-machine the entire feeder-conveyer may be moved laterally or transversely with respect to the threshing-machine in order to bring the feeder-conveyer in proper alinement therewith. At the same time the feeder-conveyer apparatus may be moved lengthwise within its derrick table or truck and the lever 119 may be manipulated to adjust the inclined length of the feeder-conveyer in order to bring its roller 130 into proper relation to the threshing-cylinder, so that the gears 131 on said shaft will properly mesh with the gears 132 on the threshing-cylinder shaft, said gears 131 also meshing with the gears on the shaft of the band-cutter cylinder and with the gears on the shaft 124, that propels the spreader-cylinder 126. The operator, seated on the deck of the threshing-machine, is able to control the shaft $104^a$ by means of the levers, so that the driving-wheels on said shaft $104^a$ may be rotated. In loading the grain on the feeder apparatus the forks are allowed to descend in order to obtain the load of grain, and the operator then manipulates one of the clutches 110 to make the spool fast with the shaft $104^a$, thereby elevating one fork and its load. The clutch is now operated to release the spool from the shaft $104^a$, and the brake is applied to control the spool in order to deposit the load of grain from the suspended fork upon the feeder-conveyer. The other fork may be operated and controlled in like manner, and the two forks may thus be used alternately or simultaneously in order to expeditiously load the feeder-conveyer with large quantities of grain. The feeder-conveyer carries the grain from the derrick or truck table to the threshing-cylinder, the grain being subjected to the action of the spreader and band-cutter before it is deposited in the threshing-machine.

In my feeder mechanism for delivery of grain to the threshing-cylinder the derrick table or truck lies in a horizontal position and is open on its upper side throughout the entire length. The feeder-conveyer extends lengthwise of the open part of the derrick-table and occupies a position therein which adapts said conveyer to receive grain at any point in the length of the derrick-table. This enables the grain to be supplied rapidly and conveniently on the feeder-conveyer and to the cylinder and dispenses with the services of a number of men to load the grain on the feeder.

Changes in the form, proportion, size, and the minor details of construction within the scope of the appended claims may be resorted to without departing from the spirit or sacrificing any of the advantages of this invention.

The frame 115 has a table $115^a$, which covers the endless feed-conveyer 114 and is provided with a longitudinal opening $115^b$, through which the grain falls onto the feed-conveyer. Slides $115^c$, disposed under the said table and supported in suitable guides, are adapted to be adjusted to vary the width of the said opening and limit the quantity of grain on the feed-conveyer to the capacity of the machine and prevent choking. The said slides may be adjusted by any suitable means. In the embodiment of my invention here shown I provide levers $115^d$ to adjust the said slides. I also provide a lever $115^e$, which is connected to the frame 115, as at $115^f$, to move said frame longitudinally, so as to engage or disengage the gear 131 with and from the gears 132 133.

Having thus described the invention, what I claim is—

1. In combination with a feeder having a derrick, a threshing-machine having a vertically-movable shaft provided with driving-wheels adapted to slide upon and to be rotated by the cylinder-driving belts, a hoisting-spool loose on said shaft, means to lock said spool to said shaft, and a brake for said spool, for the purpose set forth, substantially as described.

2. In a band-cutter and feeder, the combination with a driving-belt for propelling a threshing-cylinder, of a fork-driving shaft equipped with propelling-wheels arranged to ride upon said cylinder-driving belt, means for adjusting said shaft relatively to said belt, a fork-carrying cable, a spool actuated by said shaft and having said cable coiled thereon, and means for controlling said spool, substantially as described.

3. In a band-cutter and feeder, the combination with a threshing-cylinder and driving-belts for propelling the same, of a fork-driving shaft mounted on the deck of the threshing-machine in movable relation to the cylinder thereof and provided with frictional driving-wheels arranged to ride upon the cylinder-driving belts to keep the latter in a taut condition, means for adjusting said fork-driving shaft relatively to the cylinder-shaft, and a fork mechanism operable by said fork-driving shaft, substantially as described.

4. In a band-cutter and feeder, the combination with driving-belts for operating the cylinder of a threshing-machine, of a fork-driving shaft mounted for movement relative to said driving-belts and provided with frictional driving-pulleys adapted to ride upon said belts, means for adjusting said shaft with relation to the cylinder-shaft, independent spools mounted idly on said fork-driving shaft, a fork-cable coiled on each spool for operation individually thereby, a clutch mechanism controlled by a lever and disposed in operative relation to the spool and shaft, and independent brake devices in operative relation to said spools and separately controlled by suitable levers, the means for adjusting the fork-driving shaft, the clutches and the brakes being all disposed above the deck of the threshing-machine for convenient access, substantially as described.

5. In a band-cutter and feeder, the combination with a cylinder-shaft, of a derrick or truck contiguous to the threshing-cylinder, a wheeled conveyer-frame mounted on said derrick or truck for movement freely in a horizontal plane thereon and carrying an inclined length or section, an endless feeder-conveyer supported wholly by said wheeled frame and its inclined length, a cutter and feeder mechanism supported by said wheeled conveyer-frame, and gearing between the cutter and feeder mechanism and the cylinder-shaft, substantially as described.

6. In a band-cutter and feeder, the combination with a threshing-cylinder and a feeder-cylinder mounted in the horizontal plane above said threshing-cylinder, of a derrick or truck contiguous to said threshing-cylinder, a wheeled conveyer-frame having an inclined adjustable length or section and said frame mounted on the derrick for movement freely in a horizontal plane thereon, a band-cutter cylinder carried by said wheeled frame, gearing between the threshing-cylinder, the feeder-cylinder and the band-cutter cylinder, and an endless feeder-conveyer supported wholly by the wheeled truck and its inclined section and disposed below the band-cutter cylinder and the feeder-cylinder, the delivery end of the feeder-conveyer being disposed contiguous to the threshing-cylinder, substantially as described.

In testimony that I claim the foregoing as my own I have hereto affixed my signature in the presence of two witnesses.

CHARLES ALBERT LONG.

Witnesses:
I. C. SANFORD,
J. M. ROBINSON.